(12) United States Patent
Kim (10) Patent No.: US 10,221,750 B2
(45) Date of Patent: Mar. 5, 2019

(54) CROSS FAN ENGINE ROOM AIR BLOWER AND RELATED VEHICLE

(71) Applicant: HYUNDAI MOTOR COMPANY, Seoul (KR)

(72) Inventor: Tae-Wan Kim, Suwon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 15/387,118

(22) Filed: Dec. 21, 2016

(65) Prior Publication Data

US 2018/0100425 A1 Apr. 12, 2018

(30) Foreign Application Priority Data

Oct. 10, 2016 (KR) .................. 10-2016-0130485

(51) Int. Cl.
| | |
|---|---|
| *F01P 5/06* | (2006.01) |
| *B60K 11/04* | (2006.01) |
| *B60K 11/06* | (2006.01) |
| *F01P 1/06* | (2006.01) |
| *F01P 5/04* | (2006.01) |

(Continued)

(52) U.S. Cl.
CPC .............. *F01P 5/06* (2013.01); *B60K 11/04* (2013.01); *B60K 11/06* (2013.01); *F01P 1/06* (2013.01); *F01P 5/04* (2013.01); *F01P 11/10* (2013.01); *F01P 2001/005* (2013.01); *F01P 2005/025* (2013.01)

(58) Field of Classification Search
CPC ........ F01P 5/06; F01P 5/02; F01P 1/06; F01P 11/10; F01P 2001/005; F01P 2005/025; B60K 11/04; B60K 11/06
See application file for complete search history.

(56) References Cited

U.S. PATENT DOCUMENTS

| | | | | |
|---|---|---|---|---|
| 3,236,215 | A | * | 2/1966 | Eck .......................... F01P 7/10 123/41.05 |
| 4,372,409 | A | * | 2/1983 | Mazur ..................... F04D 17/04 123/41.49 |

(Continued)

FOREIGN PATENT DOCUMENTS

| | | |
|---|---|---|
| JP | 2006056346 A | 3/2006 |
| JP | 2008223570 A | 9/2008 |

(Continued)

*Primary Examiner* — Jacob Amick
(74) *Attorney, Agent, or Firm* — McDonnell Boehnen Hulbert & Berghoff LLP (57) ABSTRACT

The present disclosure relates to a cross fan engine room blower for a vehicle, the cross fan engine room blower including: a plurality of cross fans that are horizontally arranged in an air flow space, that have an impeller-shaped rotating blade formed along a full length of the cross fans, and that rotate to draw outside air into the engine room. Such a cross fan engine room blower may maximize an air flow rate in the engine room and reduce the possibility of foreign materials being introduced between the cross fans and a fan shroud, thereby reducing the possibility of a motor stalling or otherwise performing undesirably. Such a cross fan engine room blower may also improve an air flow quality by minimizing a dead zone of the air flow space to thereby reduce power consumption of a motor, thereby improving fuel efficiency.

16 Claims, 8 Drawing Sheets

(51) Int. Cl.
*F01P 11/10* (2006.01)
*F01P 1/00* (2006.01)
*F01P 5/02* (2006.01)

(56) References Cited

U.S. PATENT DOCUMENTS

| | | | | |
|---|---|---|---|---|
| 4,519,343 | A * | 5/1985 | Hayashi | B60K 11/085 123/41.49 |
| 6,192,838 | B1 * | 2/2001 | Matsuo | B60K 11/08 123/41.01 |
| 2005/0023057 | A1 * | 2/2005 | Maeda | B62D 25/084 180/68.1 |

FOREIGN PATENT DOCUMENTS

| | | |
|---|---|---|
| KR | 19990002705 U | 1/1999 |
| KR | 20070060879 A | 6/2007 |
| KR | 20130021593 A | 3/2013 |
| KR | 101585381 B1 | 1/2016 |

* cited by examiner

K PERSPECTIVE VIEW

FIG. 5

L PERSPECTIVE VIEW

CROSS FAN ENGINE ROOM AIR BLOWER AND RELATED VEHICLE

CROSS-REFERENCE TO RELATED APPLICATIONS

This application claims priority to and benefit of Korean Patent Application No. 10-2016-0130485, filed on Oct. 10, 2016, which is incorporated herein by reference in its entirety.

BACKGROUND

Technical Field

Example embodiments of the present disclosure relate to an engine room blower, and more particularly, to a cross fan engine room air blower and to a vehicle having such a cross fan engine room air blower. With such a cross fan engine room air blower, the vehicle may be capable of increasing an air volume passing through a cooling fan to decrease power consumption of a motor while improving air flow quality and thereby fuel efficiency.

Description of Related Art

Generally, an axial blower is configured to have a heat sink in which a fan shroud having a squared frame is combined with an axial cooling fan and a motor rotating an axial cooling fan.

When the axial blower is operated, the motor rotates the axial cooling fan, which generates air flow from the front to the back of the heat sink.

An axial blower in a vehicle is called an axial engine room blower. The axial engine room blower typically is installed in a radiator through which engine cooling water is circulated or a condenser in which a refrigerant is circulated. Heat exchange occurs between the forced air flow generated by the axial blower and the engine cooling water or the refrigerant circulated within the radiator or the condenser.

In conventional axial engine room blowers, air flow is about 2,000 m³/h.

However, because the motor directly connected to the axial cooling fan on the back surface of the heat sink is fixed to the shroud to rotate the axial cooling fan, the axial engine room blower may have various disadvantages.

First, the combination of the squared fan shroud and a circular axial cooling fan may result in a dead zone at a corner of the heat sink in which not much air flow is generated. Second, it is difficult to uniformly distribute the air volume over the front surface of the heat sink by concentrating the air volume on a blade portion of the axial cooling fan. Third, there is the possibility that the motor stalls due to the introduction of foreign materials into a narrow gap between the fan shroud and the axial cooling fan. Fourth, because the axial circular fan is disposed inside a squared heat sink and thus an outer diameter of the axial circular fan is increased, resulting in many constraints in improvement of heat radiation performance. Fifth, the fan shroud needs to have a specific shape at a portion close to the axial circular fan to reduce noise and increase the air volume.

SUMMARY

An embodiment of the present disclosure is directed to a cross fan engine room blower and a related vehicle capable of providing a forced air flow to a front surface of a heat sink. The cross fan engine room blower may include multiple cross fans in a multi-stage arrangement, with each cross fan having an impeller-shaped blade formed along a long full length of the cross fan, which may help to reduce power consumption of a motor while maximizing air flow rate introduced into the engine room, thereby improving fuel efficiency. For instance, by forming a sufficient interval between the fans of the cross fan engine room blower and a fan shroud (e.g., by widening the gap between the fans and the shroud), less foreign material may be introduced between the fans, thereby reducing or eliminating the possibility of the motor stalling or otherwise functioning undesirably, even if some foreign material is introduced.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a cross fan engine room blower includes: a heat sink case having an air flow space; a driving cross fan that, when driven by a torque-generating motor, rotates in the air flow space and draws outside air into the engine room; and a driven cross fan engaged with a spur gear to be rotated in the same rotational direction as that of the driving cross fan.

The driving cross fan may be directly rotated. The spur gear includes a driving gear coupled with the driving cross fan, a driven gear coupled with the driven cross fan, and an intermediate gear matching the rotational direction of the driving gear with that of the driven gear to rotate the driven cross fan in the same rotational direction as that of the driving cross fan.

A stabilizer may be arranged between the driving cross fan and the driven cross fan. The stabilizer may guide an air flow passing through the driving cross fan and an air flow passing through the driven cross fan, and may be horizontally arranged in the heat sink case and fixed to the heat sink case.

The heat sink case may be formed in a square shape or a rectangular shape to have the cross fans horizontally arranged therein, and may be coupled with a front surface of a fan shroud.

In accordance with another embodiment of the present disclosure, a vehicle includes: a cross fan engine room blower including a heat sink case having an air flow space; a plurality of cross fans that rotate in the air flow space to draw outside air into an engine room; a motor that rotates the plurality of cross fans; a spur gear that rotates together with the plurality of cross fans; a stabilizer that guides an air flow introduced into the plurality of cross fans; and a fan shroud coupled with a front surface of the heat sink case. The vehicle also includes a radiator coupled with a front surface of the cross fan engine room blower in the engine room.

The radiator may act as a cooling system having engine cooling water circulated therein and a temperature of the engine cooling water may be lowered due to heat exchange with air flow created by the cross fans.

DETAILED DESCRIPTION

Hereinafter, embodiments of the present disclosure are described in detail with reference to the accompanying drawings, and these embodiments may be implemented in various forms by a person having ordinary skill in the art to which the present disclosure pertains and therefore the present disclosure is not limited to the embodiments described herein.

Figure 1:
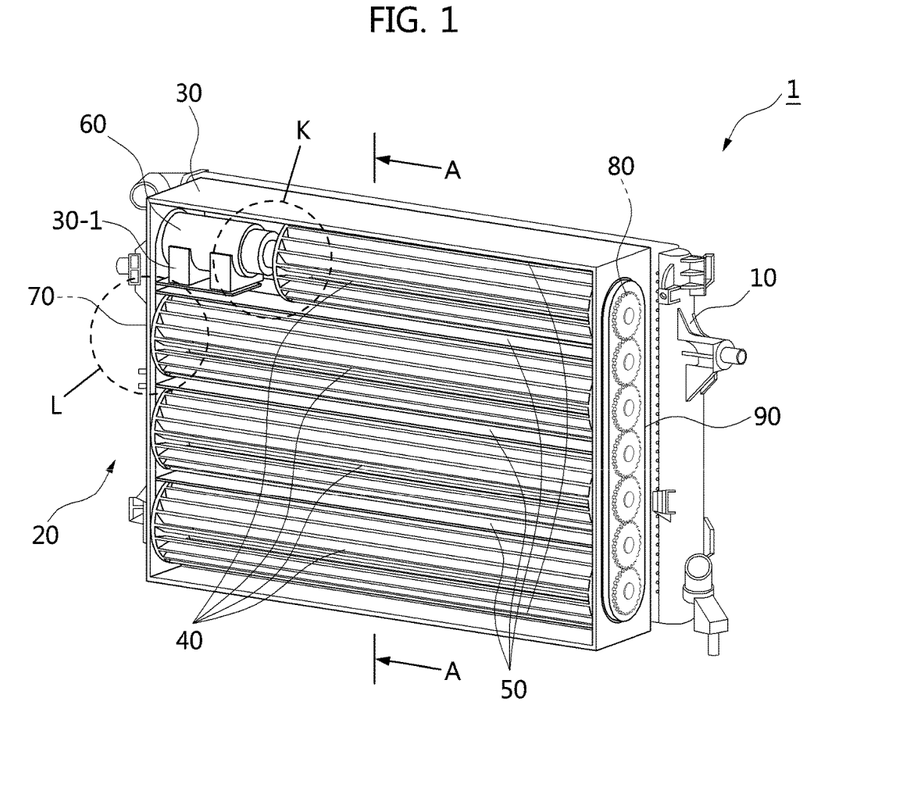
FIG. 1 is a configuration diagram of an example embodiment of a cross fan engine room blower.

Referring to FIG. 1, a cross fan engine room blower 1 is configured to have a fan shroud 10 and a cross fan unit 20.

Fan shroud 10 has a squared (or rectangular) frame and is fastened behind cross fan unit 20. If fan shroud 10 is fastened to a heat exchanger (for example, a radiator or condenser), cross fan unit 20 is positioned in front of the heat exchanger, and an air volume generated from the cross fan unit 20 may be ventilated to the heat exchanger.

Cross fan unit 20 has a heat sink case 30, a cross fan assembly 40, a stabilizer assembly 50, a motor 60, a protective cap 70, a gear assembly 80, and a gear cover 90. In an example embodiment, heat sink case 30 has a squared (or rectangular) frame and is fastened in front of fan shroud 10. Cross fan assembly 40 includes one driving cross fan and a plurality of driven cross fans and rotates to generate an air flow that is provided to fan shroud 10. Stabilizer assembly 50 is fixed to heat sink case 30 to be positioned between the cross fans of cross fan assembly 40, to thereby guide an air flow passing through the cross fan. Motor 60 is driven by a controller (not illustrated) to rotate the driving cross fan of cross fan assembly 40. Protective cap 70 covers shafts of the respective cross fans of cross fan assembly 40 exposed at a side surface of heat sink case 30. Gear assembly 80 transfers a torque of the driving cross fan of cross fan assembly 40 to the plurality of driven cross fans. Gear cover 90 covers gear assembly 80 that is exposed at the side surface of heat sink case 30.

FIGS. 2 to 6 illustrate a detailed configuration of the components of each of cross fan units 20.

Figure 2:
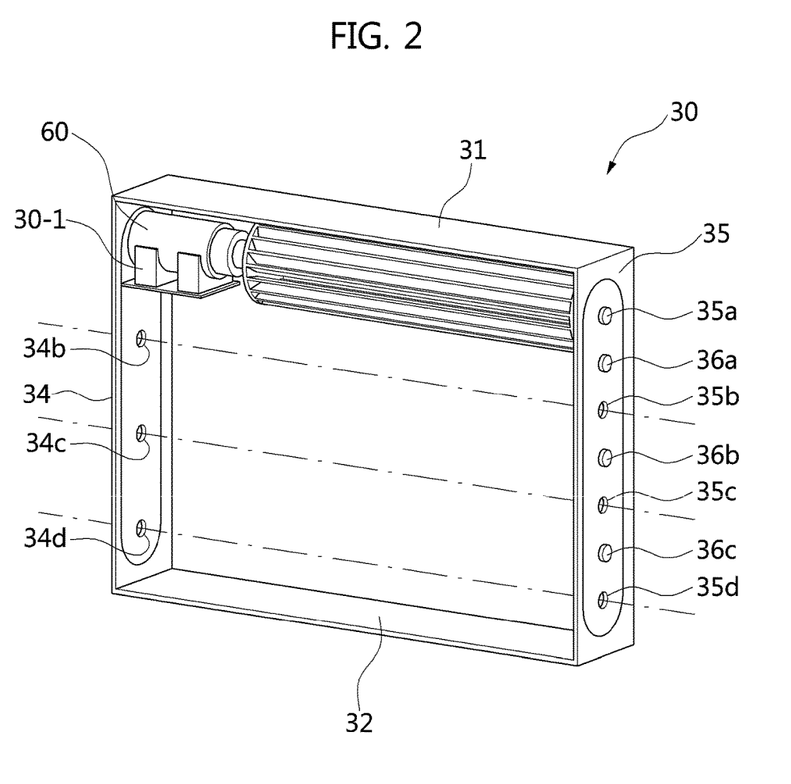
FIG. 2 is a perspective view of a heat sink case of an example cross fan unit.

Referring to FIG. 2, heat sink case 30 includes top and bottom plates 31 and 32, respectively, forming top and bottom portions of the frame, left and right plates 34 and 35, respectively forming left and right portions of the frame, and a motor bracket 30-1 having a squared (or rectangular) shape and installed at left plate 34 to connect the motor to heat sink case 30.

Left plate 34 has first, second, and third left position holes 34b, 34c, and 34d, respectively, formed therein and right plate 35 has first, second, and third position holes 35b, 35c, and 35d, respectively, formed therein. The centers of the first, second, and third left position holes 34b, 34c, and 34d and centers of the right position holes 35b, 35c, and 35d are positioned to match each other.

A reference position hole 35a is further formed at a position of right plate 35 corresponding to the motor brake 30-1 of left plate 34 and a shaft boss 41 of a driving cross fan 40-1 (see FIG. 3) of cross fan assembly 40 that is coupled with a motor shaft 61 of the motor 60 is inserted into the reference position hole 35a.

Figure 6:
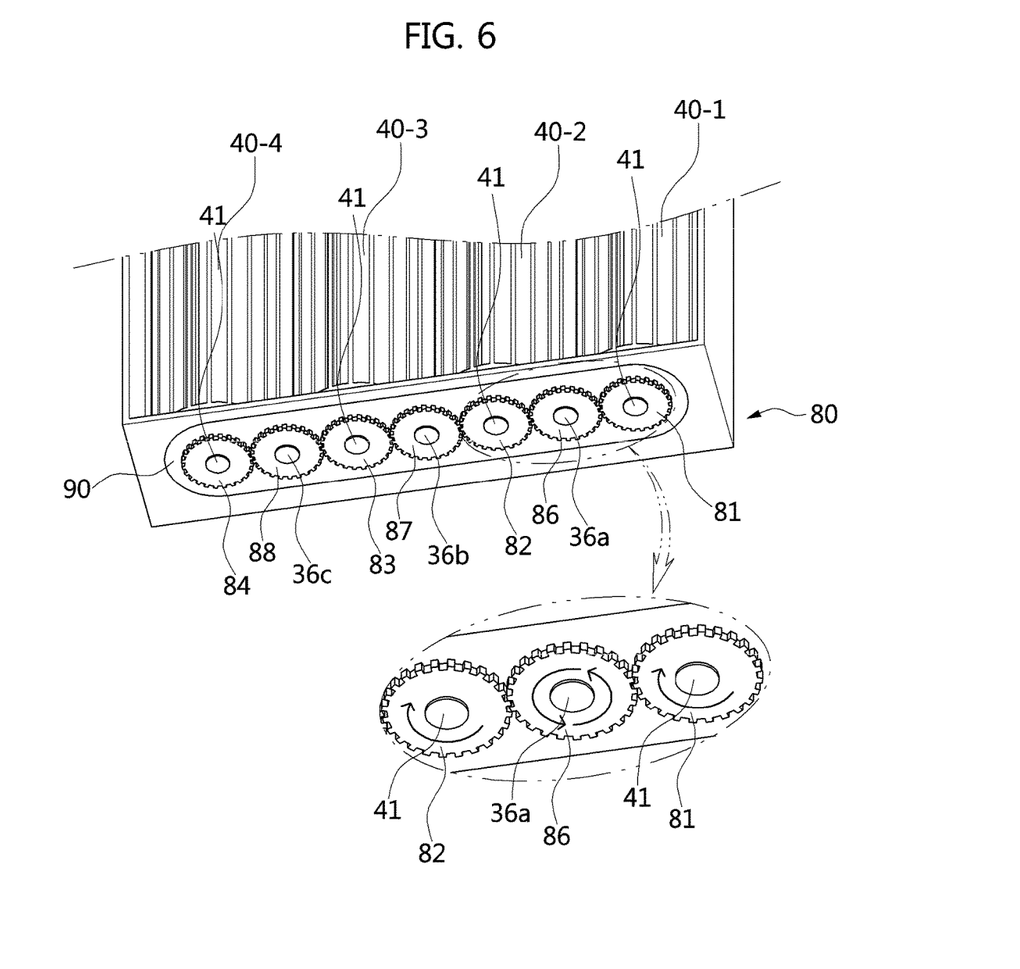
FIG. 6 is a configuration view of a gear assembly, enclosed with a gear cover, of an example cross fan unit.

As shown in FIG. 2, first, second, and third gear shafts 36a, 36b, and 36c are disposed between the first position hole 35a and the first, second, and third position holes 35b, 35c, and 35d in right plate 35. For example, first gear shaft 36a protrudes between reference position hole 35a and first right position hole 35b, and is coupled with a first intermediate gear 86 of the gear assembly 80 to freely rotate first intermediate gear 86. Second gear shaft 36b protrudes between first right position hole 35b and first right position hole 35c and is coupled with a second intermediate gear 87 of the gear assembly 80 to freely rotate second intermediate gear 87. Third gear shaft 36c protrudes between second right position hole 35c and third right position hole 35d and is coupled with a third intermediate gear 88 of the gear assembly 80 to freely rotate third intermediate gear 88. The assembled state is illustrated in FIG. 6.

Figure 3:
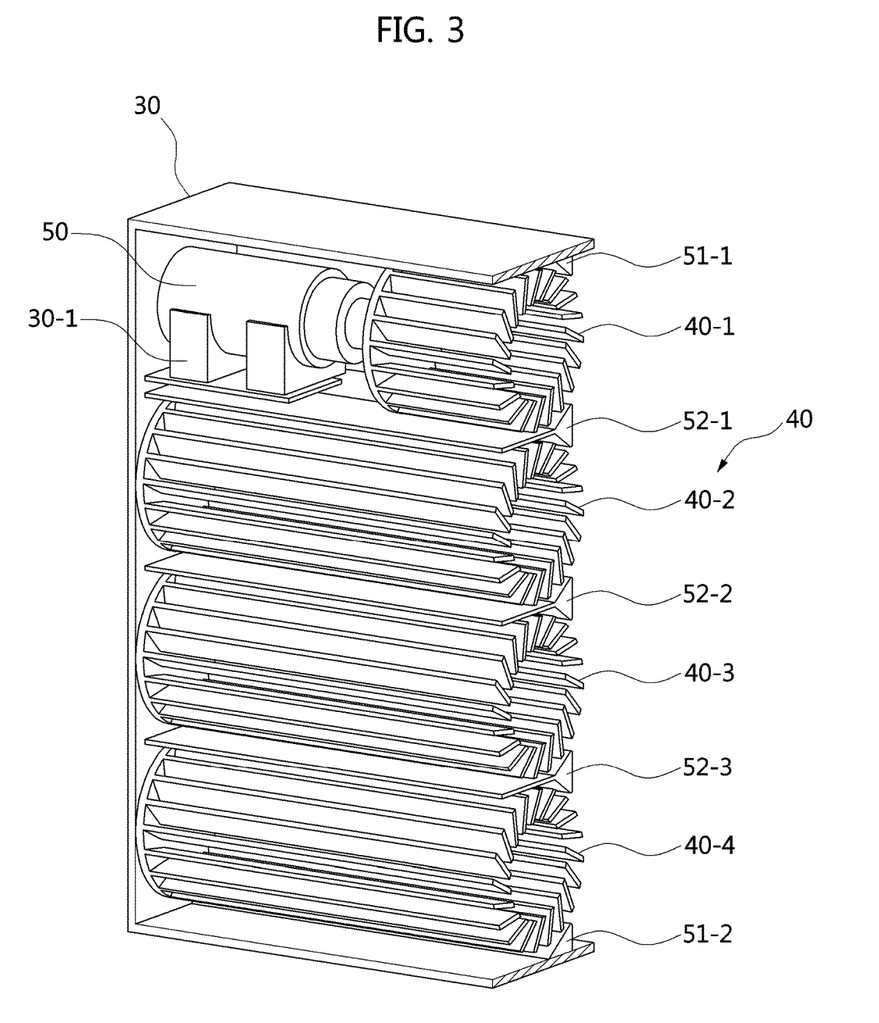
FIG. 3 is a cross-sectional perspective view of a cross fan assembly of an example cross fan unit.

Referring to FIG. 3, in an example embodiment, cross fan assembly 40 includes one driving cross fan 40-1 and a first, second, and third driven cross fans 40-2, 40-3, and 40-4, respectively. In this embodiment, the four cross fans provide an air flow volume of about 2000 m³/h. The configuration of the cross fans may be modified to accommodate another predetermined or required air flow volumes for the engine room blower.

The cross-sectional structure of driving cross fan 40-1 and first, second, and third driven cross fans 40-2, 40-3, and 40-4 is circular, with blades radially developing a extending from a rotation shaft. That is, the cross-sectional structure has an impeller shape. A shaft boss 41 is also formed at both ends of the rotation shafts of driving cross fan 40-1 and first, second, and third driven cross fans 40-2, 40-3, and 40-4. A gap between the blades draws in outside air from the front of the heat sink case 30 and blows the drawn-in outside air toward the rear of the heat sink case 30.

Shaft bosses 41 of first, second, and third driven cross fans 40-2, 40-3, and 40-4 are freely rotated while being inserted into first, second, and third left position holes 34b, 34c, and 34d and first, second, and third right position holes 35b, 35c, and 35d, respectively, of the heat sink case 30, whereas one end of shaft boss 41 of the driving cross fan 40-1 is positioned in reference position hole 35a and freely rotates while the other end of shaft boss 41 for driving cross fan 40-1 is coupled and rotated by motor 60. Because of the presence of motor 60, in this embodiment, driving cross fan 40-1 is coupled with the motor 60 is shorter than first, second, and third driven cross fans 40-2, 40-3, and 40-4.

Referring back to FIG. 3, stabilizer assembly 50 is divided into upper and lower stabilizers 51-1 and 51-2, respectively, and first, second, and third stabilizers 52-1, 52-2, and 52-3.

Upper stabilizer 51-1 is positioned above driving cross fan 40-1 and the ends of upper stabilizer 51-1 are fixed to left and right plates 34 and 35, respectively. Lower stabilizer 51-2 is positioned below third driven cross fan 40-4 and the ends of the lower stabilizer 51-2 are fixed to the left and right plates 34 and 35, respectively. First insert stabilizer 52-1 is positioned between driving cross fan 40-1 and first driven cross fan 40-2, and the ends of first insert stabilizer 52-1 are fixed to the left and right plates 34 and 35, respectively. Second insert stabilizer 52-2 is positioned between first driven cross fan 40-2 and second driven cross fan 40-3, and the ends of second insert stabilizer 52-2 are fixed to the left and right plates 34 and 35, respectively. Third insert stabilizer 52-3 is positioned between second driven cross fan 40-4 and third driven cross fan 40-4, and the ends of third insert stabilizer 52-3 are fixed to the left and right plates 34 and 35, respectively.

First insert stabilizer 52-1 separates driving cross fan 40-1 and first driven cross fan 40-2 from each other, while each of upper stabilizer 51-1 and first insert stabilizer 52-1 partially enclose upper and lower portions of driving cross fan 40-1, thereby smoothly circulating the air flow when the driving cross fan 40-1 is rotated. The same effect occurs with respect to first and second insert stabilizers 52-1 and 52-2, second and third inserter stabilizers 52-2 and 52-3, and third insert stabilizer 52-3 and lower stabilizer 51-2.

Figure 4:
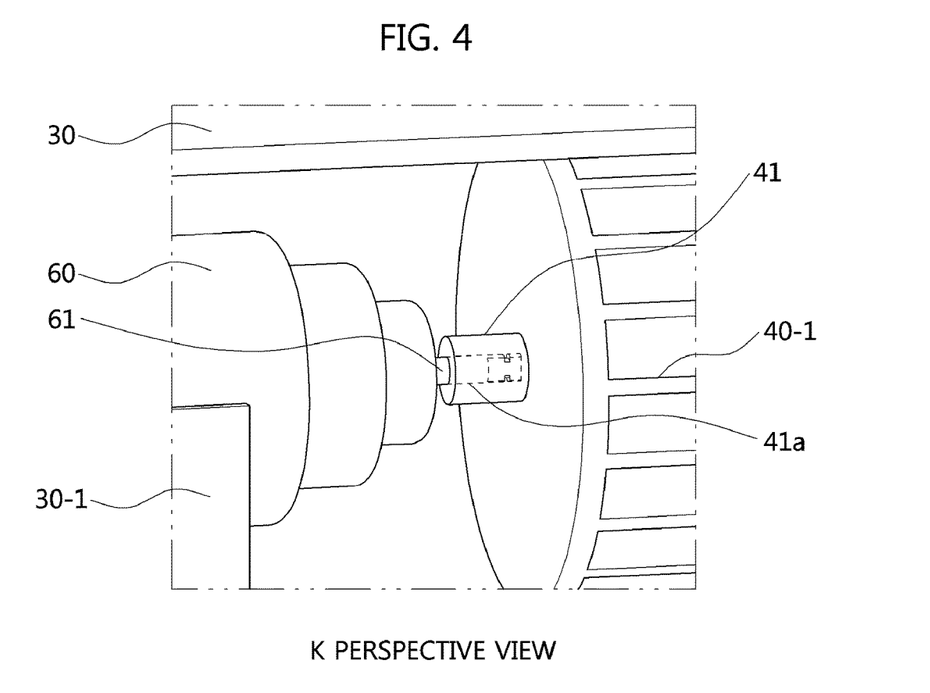
FIG. 4 is a configuration view of a motor of an example cross fan unit.

Referring to FIG. 4, a controller (not illustrated) causes motor 60 to rotate (in either a forward or reversely direction, thereby rotating motor shaft 61 and a torque of motor shaft 61 rotates driving cross fan 40-1 of cross fan assembly 40.

Motor shaft 61 of motor 60 is inserted into an insertion groove 41*a* formed in one of the shaft bosses 41. Both ends of the rotation shaft of driving cross fan 40-1, and the motor shaft 61 may be fixed to driving cross fan 40-1 by a key or a screw (or bolt).

Figure 5:
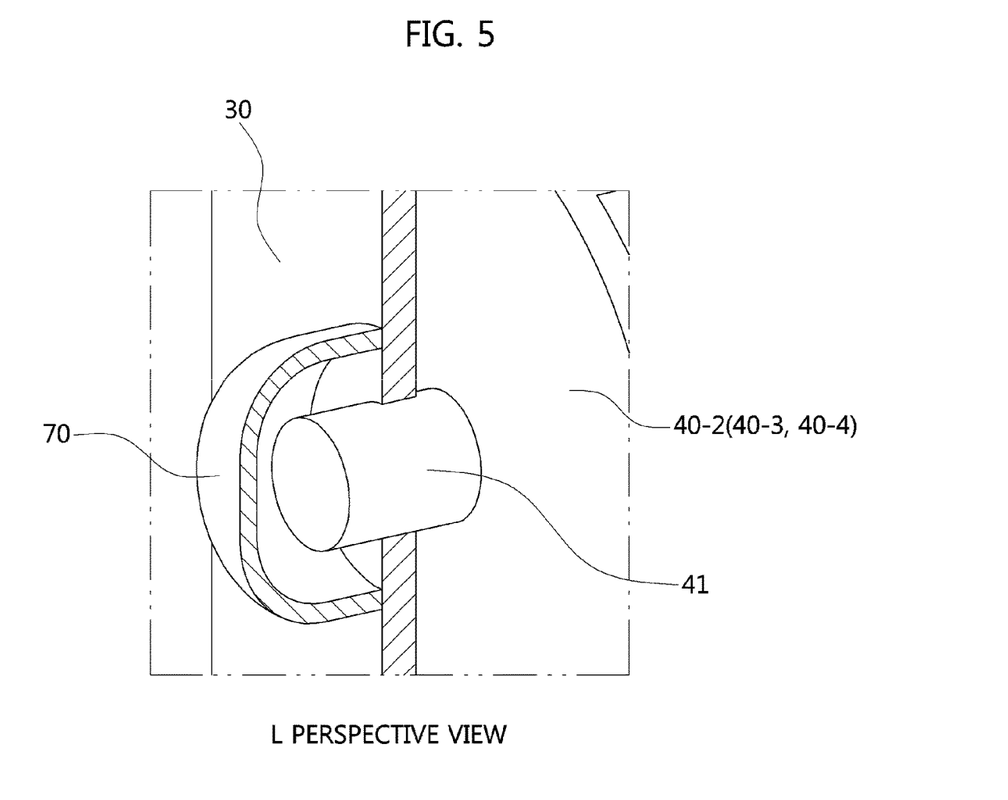
FIG. 5 is a configuration view of a protective cap of an example cross fan unit.

Referring to FIG. 5, a plurality of protective caps 70 enclose each of the shaft bosses 41 of first, second, and third driven cross fans 40-2, 40-3, and 40-4 protruding from first, second, and third positions holes 34*b*, 34*c*, and 34*d* of the left plate 34 of the heat sink case 30 to block foreign materials from being introduced into the cross fan engine room blower from the outside, such that the smooth free rotation of first, second, and third driven cross fans 40-2, 40-3, and 40-4 may be maintained.

In an example embodiment, protective caps 70 may be composed of any one of urethane, plastic, and rubber. Protective caps 70 may be inserted into fitting grooves (not illustrated) formed around first, second, and third left position holes 34*b*, 34*c*, and 34*d* of left plate 34 or may be integrally formed in left plate 34 to enclose each of the circumferences of first, second, and third left position holes 34*b*, 34*c*, and 34*d*.

Referring to FIG. 6, gear assembly 80 includes spur gears, and the spur gears are divided into one driving gear 81, first, second, and third driven gears 82, 83, and 84, respectively, and first, second, and third intermediate gears 86, 87, and 88, respectively, arranged to be engaged with each other. The spur gears are enclosed by gear cover 90 coupled with right plate 35 of heat sink case 30 to block foreign materials from being introduced into the cross fan engine room blower from the outside.

Driving gear 81 is coupled with the end of shaft boss 41 of driving cross fan 40-1 protruding from reference position hole 35*a* of right plate 35. First, second, and third driven gears 82, 83, and 84 are coupled with the ends of shaft bosses 41 protruding from first, second, and third right position holes 35*b*, 35*c*, and 35*d*, respectively, of right plate 35. First, second, and third intermediate gears 86, 87, and 88 are coupled with the ends of first, second, and third gear shafts 36*a*, 36*b*, and 36*c*, respectively, of right plate 35.

Driving gear 81 is engaged with first intermediate gear 86, the first driven gear 82 is simultaneously engaged with first and second intermediate gears 86 and 87, second driven gear 83 is simultaneously engaged with second and third intermediate gears 87 and 88, and third drive gear 84 is engaged with third intermediate gear 88. As a result, if driving gear 81 is rotated forward (clockwise) by motor 60, the forward rotation (clockwise rotation) of driving gear 81 reversely (counterclockwise) rotates first intermediate gear 86 and the reverse rotation (counterclockwise rotation) of first intermediate 86 forward rotates first driven gear 82, etc. This then causes the reverse rotation (counterclockwise rotation) of second intermediate gear 87 by first driven gear 82, the forward rotation (clockwise rotation) of second driven gear 83 by second intermediate gear 87, the reverse rotation (counterclockwise rotation) of third intermediate gear 88 by the second driven gear 83, and the forward rotation (clockwise rotation) of the second driven gear 83 by the third intermediate gear 88.

If the driving cross fan 40-1 is rotated forward (clockwise), the three first, second, and third driven cross fans 40-2, 40-3, and 40-4 are also rotated forward (clockwise).

Referring back to FIG. 6, in an example embodiment, gear cover 90 may be composed of any one of urethane, plastic, rubber, and steel. Gear cover 90 may be inserted into fitting grooves (not illustrated) formed around first, second, and third left position holes 35*b*, 35*c*, and 35*d* of right plate 35 or may be fastened to right plate 35 by a screw or a bolt to be fixed.

Figure 7:
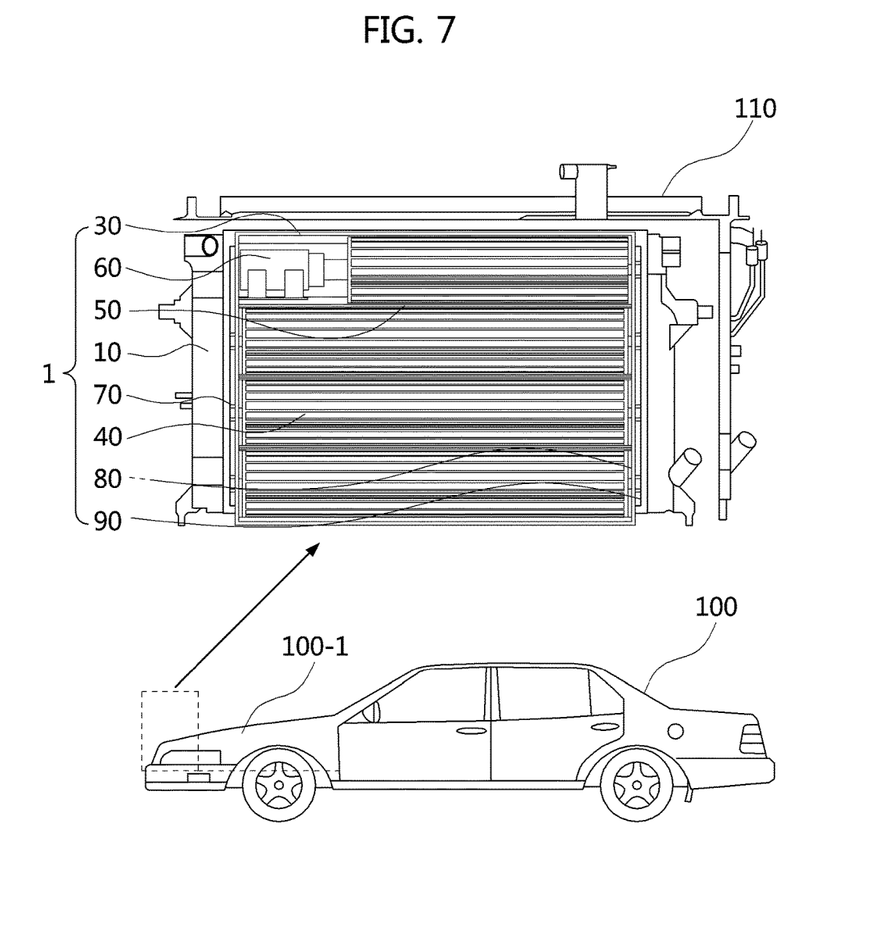
FIG. 7 is a diagram of a vehicle to which an example cross fan engine room blower is applied.

FIG. 7 illustrates an example of a vehicle 100 having a cross fan engine room blower 1 as described above.

As illustrated in FIG. 7, in vehicle 100, a radiator 110 is installed in an engine room 100-1 and the cross fan engine room blower 1 is positioned in front of radiator 110.

Radiator 110 acts as a cooling system for vehicle 100. Engine cooling fluid is circulated through radiator 110 where it exchanges heat with outside air. A condenser included in the cooling system through which an air conditioner refrigerant circulates may also increase the heat exchange effect.

Cross fan engine room blower 1 is the same as the example cross fan engine room blower 1 described with reference to FIGS. 1 to 6. Cross fan engine room blower 1 is positioned in front of radiator 110 and coupled with radiator 110 using fan shroud 10. Cross fan engine room blower 1 draws air into driving cross fan 40-1 and first, second, and third cross fans 40-2, 40-3, and 40-4 and provides the drawn-in air to radiator 110.

Figure 8:
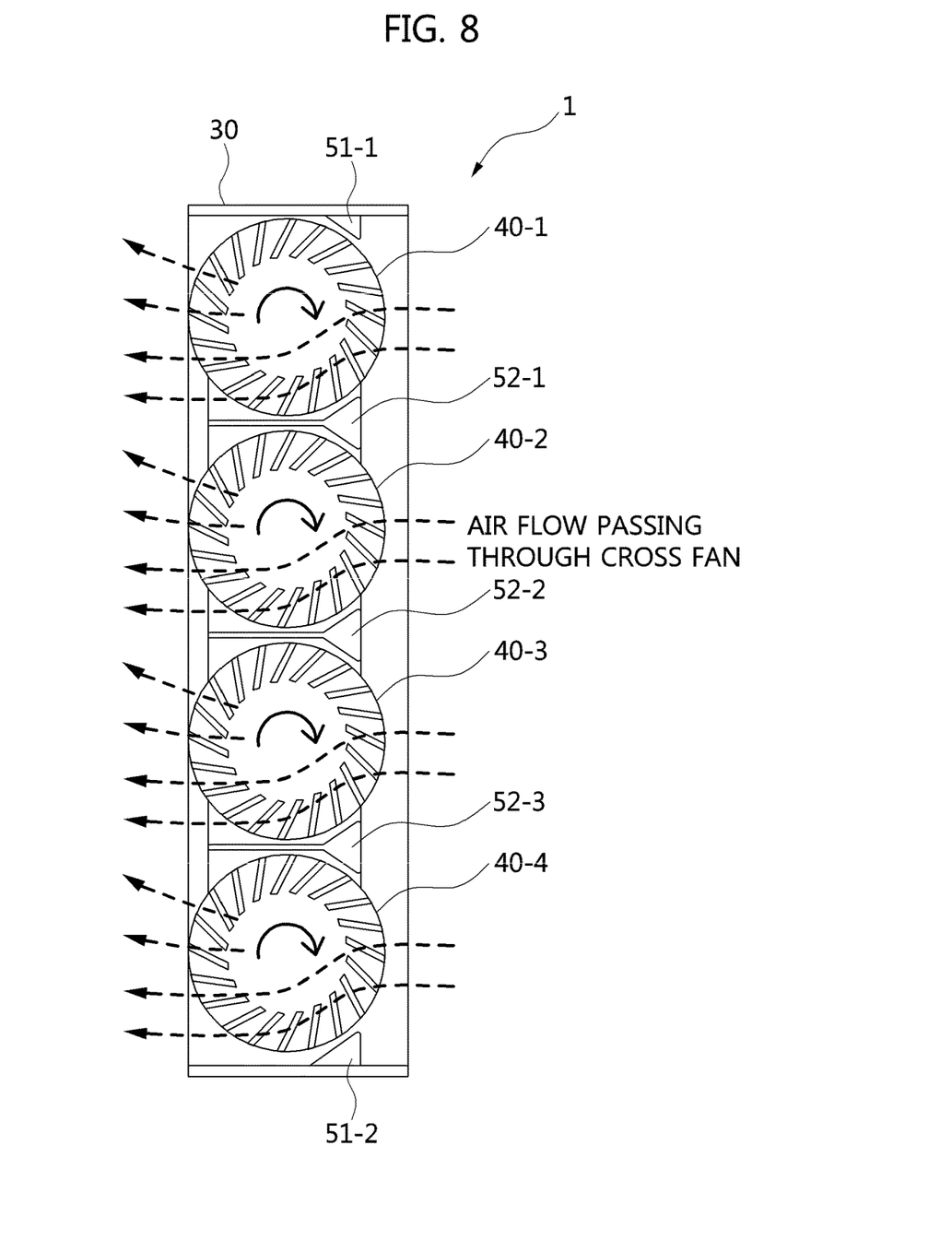
FIG. 8 is a diagram illustrating an operation state of an example cross fan engine room blower that is applied to the vehicle.

Referring to FIG. 8, if driving cross fan 40-1 is rotated forward (clockwise) by motor 60 and first, second, and third driven cross fans 40-2, 40-3, and 40-4 are then also rotated forward (clockwise) by the interaction among driving gear 81, the first, second, and third driven gears 82, 83, and 84, and the first, second, and third intermediate gears 86, 87, and 88.

As a result, driving cross fan 40-1 and first, second, and third driven cross fans 40-2, 40-3, and 40-4 are simultaneously rotated forward (clockwise) and draw in outside air from the front of vehicle 100 and blow the drawn-in outside air toward radiator 110. In this configuration, the outside air flow is guided to upper and lower stabilizers 51-1 and 51-2, respectively, and first, second, and third insert stabilizers 52-1, 52-2, and 52-3, as represented by the dotted arrows in FIG. 8, and thus maintained as a smooth flow.

As described above, the vehicle having the example cross fan engine room blower includes the plurality of cross fans 40-1, 40-2, 40-3, and 40-4 that are horizontally arranged in an air flow space. Further, the cross fan engine room blower generates a torque and rotates impeller-shaped rotating blades formed along the full length of each of the plurality of cross fans 40-1, 40-2, 40-3, and 40-4, thereby drawing the outside air into the engine room. Application of such a cross fan engine room blower may maximize the air flow rate introduced into the engine room and reduce the possibility of foreign materials being introduced between the cross fans 40-1, 40-2, 40-3, and 40-4 and the fan shroud 10, thereby reducing the possibility of the motor performing undesirably. Such an application may also improve the air flow quality by minimizing the dead zone of the air flow space to thereby reduce the power consumption of the motor 60, thereby improving the fuel efficiency.

A vehicle having the disclosed cross fan engine room blower described above may have the following advantages and effects.

First, it is possible to uniformly distribute the air volume over the front surface of the heat sink by using the cross fans. Second, it is possible to improve the efficiency of the cooling fan by removing the corner space dead zone of the heat sink by matching the shape of the cross fans with that of the heat sink. Third, it is possible to reduce or eliminate the possibility of the motor stalling due to foreign materials, even though the foreign materials may still be introduced into the gap, by widening the space between the cross fans and the fan shroud. Fourth, it is possible to reduce the power consumption of the motor by improving the air flow quality while maximizing the air flow rate into the engine room, to thereby improve the fuel efficiency of the vehicle. Fifth, it is possible to reduce the thickness of the engine room blower by changing the combination in the front and back directions of the cross fans and the motor to the left and right structure and greatly improve the applicability of the engine room layout by reducing the thickness of the engine room blower.

The foregoing embodiments are only examples to allow a person having ordinary skill in the art to which the present disclosure pertains (hereinafter, referred to as "those skilled in the art") to easily practice the present disclosure. Accordingly, the present disclosure is not limited to the foregoing embodiments and the accompanying drawings, and therefore, a scope of the present disclosure is not limited to the foregoing embodiments. Accordingly, it will be apparent to those skilled in the art that substitutions, modifications and variations can be made without departing from the spirit and scope of the disclosure as defined by the appended claims and can also belong to the scope of the present disclosure.

What is claimed is:

1. A cross fan engine room blower, comprising:
    a heat sink case having a motor disposed therein;
    a driving cross fan disposed in the heat sink case that is rotated by the motor;
    at least one driven cross fan disposed in the heat sink case that is rotatably engaged with the driven cross fan by a spur gear connecting the driving cross fan and the driven cross fan;
    wherein the heat sink case defines an air flow space, and wherein the cross fans rotate in the air flow space to draw air into a vehicle engine room.

2. The cross fan engine room blower of claim 1, wherein the driving cross fan and the at least one driven cross fan are horizontally arranged in the air flow space.

3. The cross fan engine room blower of claim 1, wherein the driving and driven cross fans have rotating blades formed in an impeller shape along a full length of the cross fans.

4. The cross fan engine room blower of claim 1, wherein the rotational direction of the driving cross fan and the at least one driven cross fan are the same direction.

5. The cross fan engine room blower of claim 1, wherein the driving cross fan and the motor are fixed by a fitting coupling.

6. The cross fan engine room blower of claim 1, wherein a total number of the cross fans is selected based on a predetermined amount of air flow.

7. The cross fan engine room blower of claim 1, wherein the spur gear is covered with a gear cover that is coupled with the heat sink case, and wherein the gear cover is configured to block foreign materials from being introduced into the cross fan engine room blower.

8. The cross fan engine room blower of claim 1, wherein the driving cross fan is shorter than the driven cross fan.

9. The cross fan engine room blower of claim 1, wherein the driven cross fan includes a shaft boss freely rotated in the heat sink case, and wherein an end of the shaft boss is covered with a protective cap that is coupled with the heat sink case and configured to block foreign materials from being introduced into the cross fan engine room blower.

10. The cross fan engine room blower of claim 1, wherein a stabilizer is arranged between the driving cross fan and the driven cross fan and guides an air flow passing through the driving cross fan and an air flow passing through the driven cross fan.

11. The cross fan engine room blower of claim 10, wherein the stabilizer is horizontally arranged in the heat sink case to be fixed to the heat sink case.

12. The cross fan engine room blower of claim 1, wherein the heat sink case is formed in a squared shape or a rectangular shape in which the cross fans are horizontally arranged.

13. The cross fan engine room blower of claim 1, wherein the heat sink case is coupled with a front surface of a fan shroud.

14. The cross fan engine room blower of claim 1, wherein the spur gear includes a driving gear coupled with the driving cross fan, a driven gear coupled with the driven cross fan, and an intermediate gear matching a rotational direction of the driving gear with that of the driven gear.

15. A vehicle, comprising:
    an engine room;
    a cross fan engine room blower including:
        a heat sink case defining an air flow space,
        a driving cross fan disposed in the heat sink case;
        at least one driven cross fan disposed in the heat sink case;
        a motor disposed in the heat sink case that rotates the driving cross fan,
        a spur gear connecting the driving cross fan and the at least one driven cross fan that rotatably engages the driving cross fan and the at least one driven cross fans,
        a stabilizer that guides an air flow introduced into the driving fan and at least one driven cross fan, and
        a fan shroud coupled with a front surface of the heat sink case; and
    a radiator coupled with a front surface of the cross fan engine room blower in the engine room.

16. The vehicle of claim 15, wherein the radiator circulates an engine cooling fluid, and wherein a temperature of the engine cooling fluid is lowered by heat exchange with an air flow created by the cross fan engine room blower.

* * * * *